United States Patent
Li et al.

(10) Patent No.: US 10,650,570 B2
(45) Date of Patent: May 12, 2020

(54) DYNAMIC LOCAL TEMPORAL-CONSISTENT TEXTURED MESH COMPRESSION

(71) Applicant: JJK Holdings, LLC, Santa Clara, CA (US)

(72) Inventors: Zhong Li, Newark, DE (US); Jason Chieh-Sheng Yang, Sunnyvale, CA (US)

(73) Assignee: JJK Holdings, LLC, Santa Clara, CA (US)

(*) Notice: Subject to any disclaimer, the term of this patent is extended or adjusted under 35 U.S.C. 154(b) by 0 days.

(21) Appl. No.: 16/532,412

(22) Filed: Aug. 5, 2019

(65) Prior Publication Data

US 2019/0371045 A1   Dec. 5, 2019

Related U.S. Application Data

(63) Continuation of application No. 15/898,127, filed on Feb. 15, 2018, now Pat. No. 10,417,806.

(51) Int. Cl.
| | |
|---|---|
| *G06T 17/20* | (2006.01) |
| *G06T 15/04* | (2011.01) |
| *H04N 13/111* | (2018.01) |
| *H04N 13/161* | (2018.01) |
| *G06T 17/10* | (2006.01) |

(52) U.S. Cl.
CPC ............ *G06T 15/04* (2013.01); *G06T 17/205* (2013.01); *H04N 13/111* (2018.05); *H04N 13/161* (2018.05); *G06T 17/10* (2013.01); *G06T 17/20* (2013.01); *G06T 2219/00* (2013.01); *G06T 2219/20* (2013.01)

(58) Field of Classification Search
CPC ....... G06T 15/04; G06T 17/205; G06T 17/10; G06T 2219/20; G06T 17/20; G06T 2219/00; G06T 9/001; H04N 13/161; H04N 13/111; H04N 19/54; H04N 19/20
See application file for complete search history.

(56) References Cited

U.S. PATENT DOCUMENTS

2016/0127681 A1* 5/2016 Turbell ................. H04N 7/141
                                                                  348/14.03
2019/0026942 A1* 1/2019 Zhang .................. G06T 15/205

* cited by examiner

*Primary Examiner* — Robert J Craddock
(74) *Attorney, Agent, or Firm* — Kilpatrick Townsend & Stockton, LLP

(57) ABSTRACT

Mesh-based raw video data (or 3D video data) includes a sequence of frames, each of which includes geometry data (e.g., triangle meshes or other meshes) and texture map(s) defining one or more objects. The raw 3D video data is segmented based on consistent mesh topology across frames. For each segment, a consistent mesh sequence (CMS) is defined and a consistent texture atlas (CTA) is generated. The CMS and CTA for each segment are compressed and stored as compressed data files. The compressed data files can be decompressed and used to render displayable images.

16 Claims, 9 Drawing Sheets

DYNAMIC LOCAL TEMPORAL-CONSISTENT TEXTURED MESH COMPRESSION

CROSS-REFERENCE APPLICATIONS

This application is a continuation of U.S. application Ser. No. 15/898,127, filed on Feb. 15, 2018, entitled "DYNAMIC LOCAL TEMPORAL-CONSISTENT TEXTURED MESH COMPRESSION", which is hereby incorporated by reference in its entirety.

BACKGROUND

The present disclosure relates generally to compression of three-dimensional image data and in particular to dynamic local temporal-consistent textured mesh compression.

Traditionally, digital video data is organized as a sequence of images, or frames, where the content of each frame defines a two-dimensional (2D) array of pixels to be presented on a display device. Numerous techniques have been developed to compress such data for efficient storage and transmission. Pixel-based image data is useful for some forms of video presentation; however, it is not well suited to virtual reality (VR), augmented reality (AR), or other immersive video experiences where the viewer becomes part of the scene.

Free-viewpoint video (FVV) can support a more immersive video experience. Rather than representing a frame as a two-dimensional array of pixels, FVV data typically represents each frame as a three-dimensional (3D) scene that includes one or more three-dimensional geometric objects. Within each frame, each object may have a position, and the objects may change position from one frame to the next. Further, some are all of the objects may deform (i.e., change shape). Objects can be represented using triangle meshes, as is conventional in the field of computer graphics, and the vertices of the mesh may move relative to each other to represent the changing shape of the object. Textures can be associated with the triangle meshes using conventional texture mapping techniques. To generate a video presentation using FVV, a user typically interacts with a video-rendering device (e.g., a computer) to determine a viewpoint, and the video-rendering device renders an image from that viewpoint using the object geometry of the frame. The viewpoint can be static or dynamic, depending on the application, and each frame is rendered from the appropriate viewpoint.

FVV, however, is extremely data-intensive, requiring the storage and/or transmission of object and texture data for each frame (as opposed to just a pixel array for conventional video data). This can impair performance and/or limit the contexts in which FVV can be used.

SUMMARY

Certain embodiments of the present invention relate to compression techniques that can be used for mesh-based video data (also referred to as 3D video data), including but not limited to FVV data. Embodiments described herein receive as input uncompressed ("raw") 3D video data that includes a sequence of frames, each of which includes geometry data (e.g., triangle meshes or other meshes) and texture map(s) defining one or more objects. The input sequence of frames is split into a number of "segments" such that mesh topology is consistent across all frames within a given segment. For instance, a mesh may deform within a segment, but the number and connectivity of vertices does not change within the segment; a sequence of meshes having consistent topology is referred to as a consistent mesh sequence (CMS), and a segment may include multiple CMS (e.g., if multiple objects are represented). It is to be understood that mesh topology need not be consistent between segments. After a segment having a CMS is identified, a consistent texture atlas (CTA) is constructed from the texture map(s) associated with the object(s) in the segment, and the texture(s) from the CTA is (are) re-projected onto the mesh of the CMS. The CTA is then compressed, e.g., using standard video compression techniques. The CMS is also compressed, e.g., by defining vertex trajectory vectors that can be clustered and compressed based on principal component analysis. The compressed CTA and compressed CMS for each segment can be stored as compressed data files. The compressed data files can be decompressed and used to render displayable images.

In some embodiments, the compressed data file can be transmitted to a computer system remote from the computer system that generated the compressed data file, and the remote system can decompress the compressed data file and render images for display. The compressed data file format can be suitable for streaming video presentations. Specifically, the format allows the data for each segment to be sent independently of data for any other segments, and therefore it is not necessary for the receiving device to wait for all of the data to be received before beginning to render and display images, nor is it necessary for the receiving device to begin rendering with any particular segment.

The following detailed description, together with the accompanying drawings, will provide a better understanding of the nature and advantages of the claimed invention.

DETAILED DESCRIPTION

Figure 1:
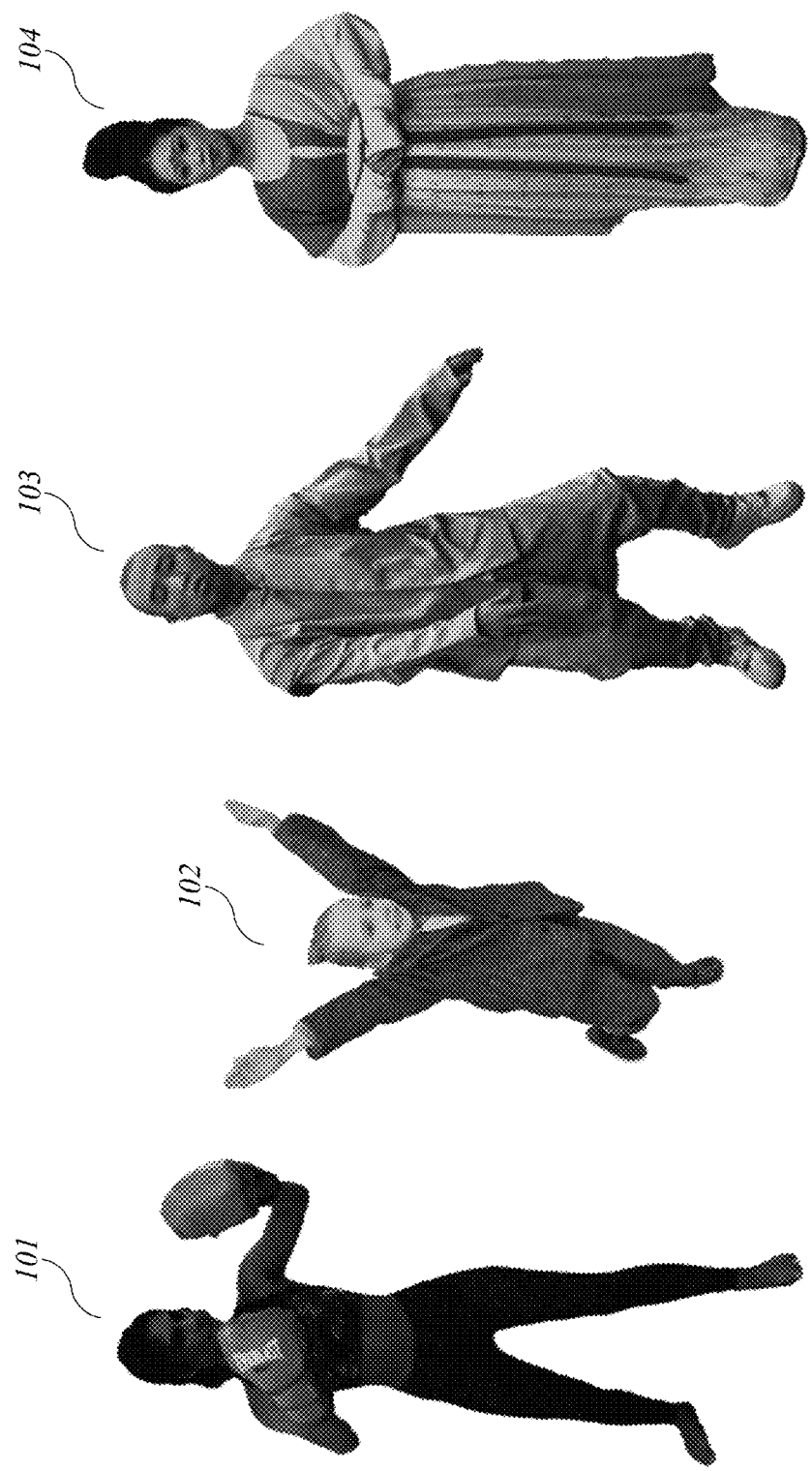
FIG. 1 shows an example of rendered image frames showing deformable objects that can be represented as meshes.

Certain embodiments of the present invention relate to compression techniques that can be used for mesh-based video data (also referred to as 3D video data), including but not limited to FVV data. Embodiments described herein receive as input uncompressed ("raw") 3D video data that includes a sequence of frames, each of which includes geometry data (e.g., triangle meshes or other meshes) and texture map(s) defining one or more objects. The input sequence of frames is split into a number of "segments" such that mesh topology is consistent across all frames within a given segment. For instance, a mesh may deform within a segment, but the number and connectivity of vertices does not change within the segment; a sequence of meshes having consistent topology is referred to as a consistent mesh sequence (CMS), and a segment may include multiple CMS (e.g., if multiple objects are represented). It is to be understood that mesh topology need not be consistent between segments. After a segment having a CMS is identified, a consistent texture atlas (CTA) is constructed from the texture map(s) associated with the object(s) in the segment, and the texture(s) from the CTA is (are) re-projected onto the mesh of the CMS. The CTA is then compressed, e.g., using standard video compression techniques. The CMS is also compressed, e.g., by defining vertex trajectory vectors that can be clustered and compressed based on principal component analysis. The compressed CTA and compressed CMS for each segment can be stored as compressed data files. The compressed data files can be decompressed and used to render displayable images.

In some embodiments, the compressed data file can be transmitted to a computer system remote from the computer system that generated the compressed data file, and the remote system can decompress the compressed data file and render images for display. The compressed data file format can be suitable for streaming video presentations. Specifically, the format allows the data for each segment to be sent independently of data for any other segments, and therefore it is not necessary for the receiving device to wait for all of the data to be received before beginning to render and display images, nor is it necessary for the receiving device to begin rendering with any particular segment.

As used herein, "video" refers to a time ordered series of "frames," where each frame contains data defining a scene as it appears at a given point in time. The video is time-ordered, and it is generally assumed that if the frames are rendered and presented as display images in order at a constant rate (e.g., 30 frames per second), a human observer can perceive the series of display images as depicting objects that may move. As used herein, an "object" can be a representation of any physical thing.

"Free viewpoint video" (FVV) refers generally to video data in which the frame data is provided in a format that allows a viewpoint to be selected or modified as the frames are being rendered and presented on a display. Frame data for FVV (or other 3D video data) may include data that provides a geometric description of one or more 3D objects to be rendered, referred to herein as "object geometry." Object geometry can be specified using one or more meshes, i.e. sets of interconnected vertices, that represent the surface as a set of connected polygons (e.g., triangles). Each vertex in a mesh has specified coordinates (usually in an object-relative coordinate space) and connectivity to adjacent vertices (which may be expressly specified or implicit, e.g., in the ordering of vertices in a data structure), and a mesh can include any number of vertices. Each vertex may have other associated attributes, such as a color and/or coordinates in a texture space that defines a texture to be applied to the mesh (or a portion thereof); texture spaces are typically defined using two-dimensional coordinates (referred to as uv coordinates), although other systems may be used. Depending on implementation, a vertex may have one or more associated textures, and one or more textures may be applied to an object's surface or portions thereof.

To further illustrate these concepts, FIG. 1 shows an example of rendered image frames 101-104 showing deformable objects (in this case human figures) that can be represented as meshes. It will be appreciated that the shapes of these figures are dynamic; for instance, the boxer in frame 101 has arms that can move relative to the rest of her body to throw a punch, thus changing the shape of (or "deforming") the graphical object representing the boxer. In terms of object geometry, deformation can be captured by changing the relative positions of vertices in the mesh while keeping other attributes the same.

It is assumed for purposes of this description that "raw" 3D video data has been generated such that each frame includes one or more meshes defining one or more objects. It is also assumed that each mesh has one or more associated textures, which can be mapped to the mesh using standard texture mapping techniques (e.g., mapping each vertex of the mesh to coordinates in the uv coordinate space of the texture). Texture maps can be used to represent various attributes that may vary across the surface of the mesh, including color, surface normal, lighting effects, surface properties (e.g., reflectivity, transparency), and so on, and any number of textures representing any number of attributes may be associated with a single mesh.

At least one of the objects is assumed to be deformable, although this is not strictly required, and techniques described below can be applied to 3D video depicting static objects (i.e., objects that do not deform). Raw 3D video data of this kind can be generated in a variety of ways, including motion capture processes and/or computer-generated-animation processes, and compression algorithms described below can be independent of the particular manner in which the raw 3D video data was generated.

Meshes depicting realistic objects typically contain hundreds or thousands of vertices, and in raw 3D video data (as the term is used herein), each frame contains complete vertex information for each object, including texture map(s), so that any one frame can be rendered without reference to data from any other frame. Consequently, the raw 3D video data can be quite large, which presents difficulties for storage and transmission.

Figure 2:
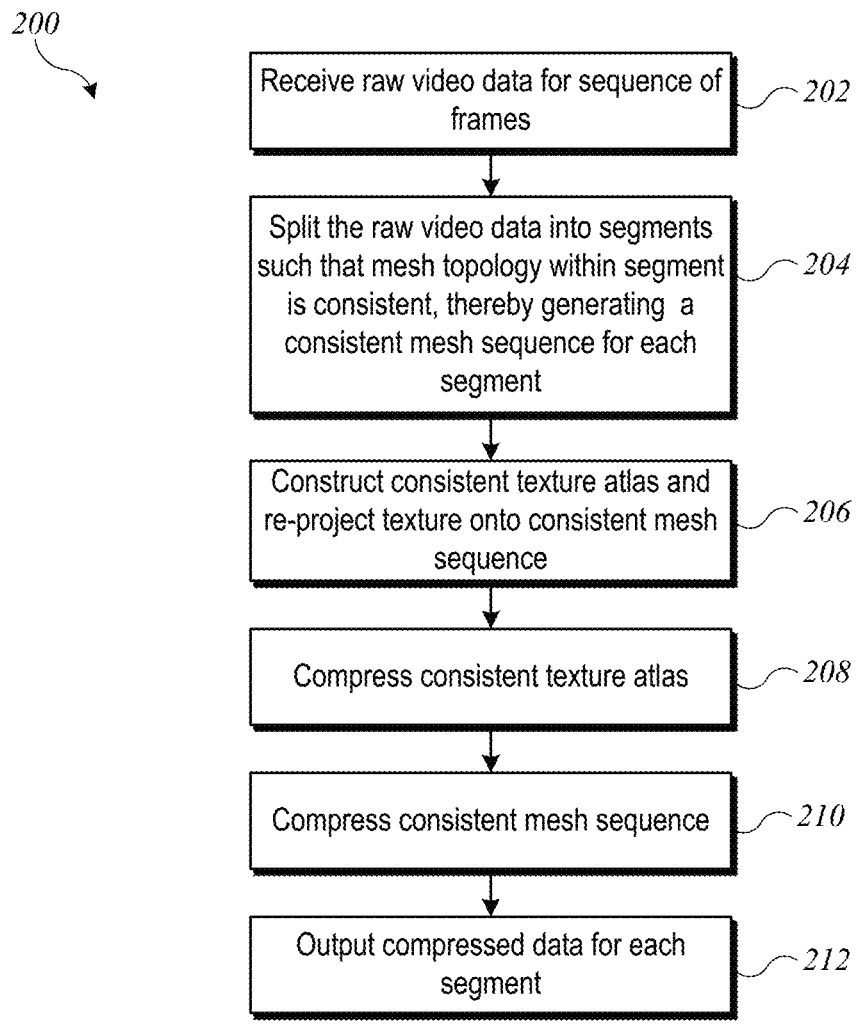
FIG. 2 shows a flow diagram of a data compression process according to an embodiment of the present invention.

Certain embodiments of the present invention provide methods and systems that can be used to compress the raw 3D video data. FIG. 2 shows a flow diagram of a data compression process 200 according to an embodiment of the present invention. Data compression process 200 can be implemented in a variety of computer systems, examples of which are described below.

Process 200 can begin at block 202, when raw vide data for a sequence of frames is received. As described above, raw 3D video data for each frame can include a mesh defining an object and one or more texture maps associated with the mesh. (It is to be understood that a frame may include multiple meshes defining multiple objects and/or multiple meshes defining a single objet.) In some embodiments, the computer system that executes process 200 may also generate the raw 3D video data; in other embodiments, raw 3D video data can be retrieved from storage or received via a network interface.

At block 204, process 200 can split the raw 3D video data into segments such that the mesh topology within each segment is consistent. As used herein, a "segment" of 3D video data consists of a temporally contiguous subset of the frames, and mesh topology is considered "consistent" within a segment if, for all frames within the segment, the mesh has the same set of vertices and the same connectivity between vertices. Accordingly, processing at block 204 can include comparing mesh topology between consecutive frames to detect changes; where a change is found, a segment boundary is defined. (If there are multiple meshes per frame, a topological change in any mesh may result in a segment boundary.) In some embodiments, each segment is made as long as possible, so that segment boundaries are only created where mesh topology changes. Thus, in some cases, segmentation at block 204 may result a single segment covering the entire sequence of frames of the raw 3D video data.

Figure 3:
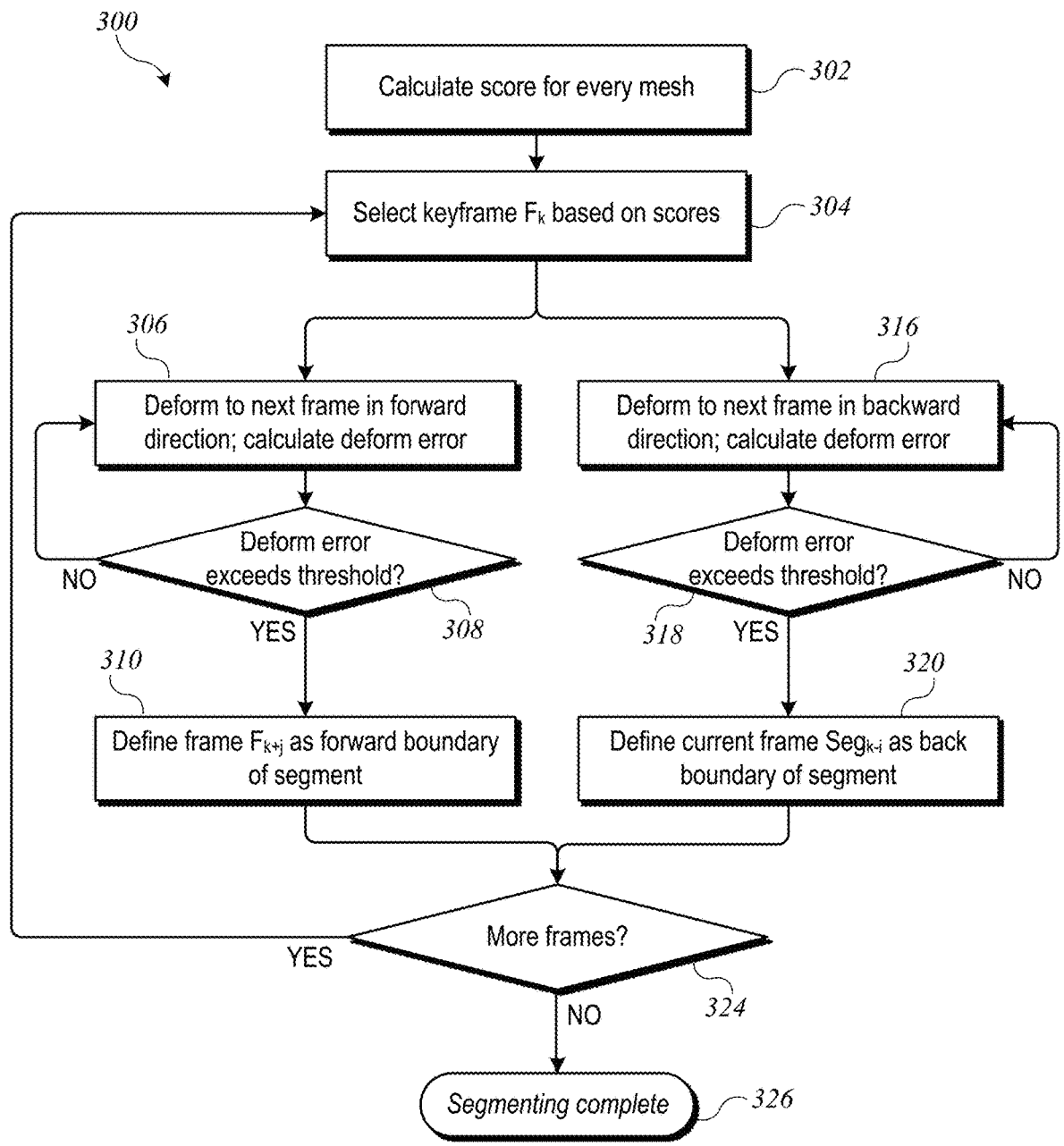
FIG. 3 shows a flow diagram of a process for splitting a sequence of frames of raw 3D video data into segments according to an embodiment of the present invention.

Various algorithms can be used to identify segment boundaries. FIG. 3 shows a flow diagram of a process 300 for splitting a sequence of frames of raw 3D video data into segments according to an embodiment of the present invention. Process 300 can be implemented, e.g., at block 204 of process 200 of FIG. 2.

At block 302, a scoring algorithm is used to compute a score for every mesh (or frame) in the raw 3D video data. In some embodiments, the score can be a feasibility score of each frame being a keyframe, where a "keyframe" is a frame from which the mesh can deform to other meshes in the segment with relatively few artifacts. One example of a scoring algorithm that can be used at block 302 is described in A. Collet et al., "High-Quality Streamable Free-Viewpoint Video," *ACM Transactions on Graphics* (*TOG*), 34(4): 69 (2015) (see, in particular, section 7.1). Other scoring algorithms can also be used.

At block 304, a keyframe for defining a segment is selected based on the scores. For instance, frames can be sorted into a prioritized order based on the scores, and the frame with the highest priority is selected.

To define segment boundaries, deformation of the mesh of the keyframe in the forward and backward (temporal) directions is performed. For instance, at block 306, the mesh of the keyframe (frame $F_k$) is deformed to match the mesh of the next frame forward in time (frame $F_{k+1}$), and a deform error (reflecting the difference between the deformed mesh from frame $F_k$ and the actual mesh of frame $F_{k+1}$) is computed. In some embodiments, deformation of the mesh can include applying registration algorithms to identify corresponding vertices in different frames within a segment. Preferred algorithms include non-rigid registration algorithms that define a source mesh (e.g., the mesh as it appears in the first frame of the segment or the keyframe of the segment) and build a deform graph for a target mesh (e.g., the mesh as it appears in another frame of the segment). The deform graph has control points, each of which has a rotation and translation parameter that indicate how to deform the source mesh to match the target mesh. A deform graph can be constructed for each frame. Various algorithms can be used; one example is described in Z. Li et al., "Robust 3D Human Motion Reconstruction Via Dynamic Template Construction," available at http://www.arxiv.org/abs/1801.10434 (see, in particular, section 3).

At block 308, if the deform error does not exceed a threshold, processing returns to block 306 to consider the next frame forward in time (frame $F_{k+2}$). Once the deform error is found to exceed the threshold at block 308 (e.g., for frame $F_{k+j+1}$), then at block 310, the forward segment boundary is determined to be frame $F_{k-j}$.

Similarly, in the backward direction, at block 316, the mesh of the keyframe (frame $F_k$) is deformed to match the mesh of the next frame backward in time (frame $F_{k-1}$), and a deform error (reflecting the difference between the deformed mesh from frame $F_k$ and the actual mesh of frame $F_{k-1}$) is computed. At block 318, if the deform error does not exceed a threshold, processing returns to block 316 to consider the next frame backward in time (frame $F_{k-2}$). Once the deform error is found to exceed the threshold at block 318 (e.g., for frame $F_{k-i-1}$), then at block 320, the backward segment boundary is determined to be frame $F_{k-i}$.

At block 324, process 300 can determine whether any frames remain that have not been assigned to a segment. If so, then process 300 can return to block 304 to select a new keyframe, e.g., the highest-priority frame that is not yet part of a segment, and repeat the deformation process to determine segment boundaries. In some embodiments, if at block 306 or block 316, the next frame in the forward or backward direction has already been assigned to a segment, the iteration can stop, so that each frame is assigned to exactly one segment. Further, in some embodiments, process 300 may place an upper limit on the number of frames in a single segment (e.g., 24 frames, 30 frames, 60 frames), and a segment boundary may be created if the limit is reached without exceeding the deform error threshold.

Once every frame of the raw input data has been assigned to a segment, process 300 can end at block 326.

Figure 4:
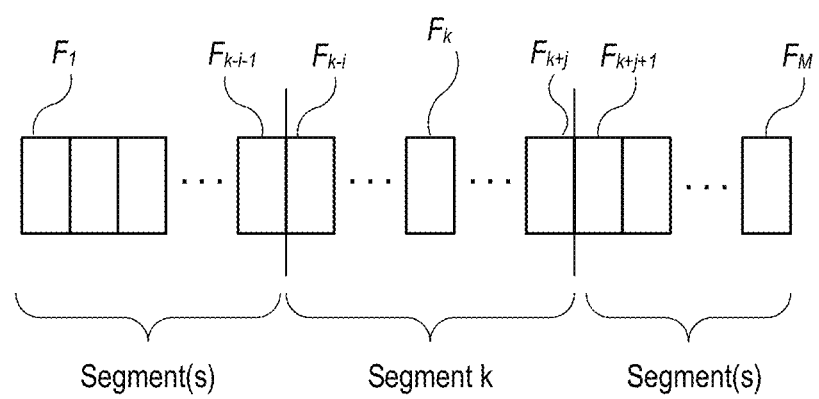
FIG. 4 shows an example of frames split into segments according to an embodiment of the present invention.

FIG. 4 shows an example of data segmented using process 300 (or other processes) according to an embodiment of the present invention. A total of M frames of data ($F_1$-$F_M$) are received. Using process 300, frame $F_k$ is selected as a keyframe, and iteration backward and forward in time is used to identify frames $F_{k-i}$ and $F_{k+j}$ as the backward and forward segment boundaries. One or more other segments can be formed from frames $F_1$ to $F_{k-i-1}$ (assuming k−i>1), and one or more other segments can be formed from frames $F_{k+j+1}$ to $F_M$ (assuming k+j<M). Each segment includes a consistent mesh sequence (CMS), which can be represented using the source mesh for the segment and the deform graphs for each other frame of the segment.

Referring again to FIG. 2, after block 204, the frames of the raw 3D video data have been split into one or more segments, each segment including one or more frames. Assuming that the raw 3D video data defines an object in continuous motion, it is likely that most or all segments will include multiple frames; however, this is not required, and there may be instances where a segment includes just one frame. Further, it is possible that there may be a single segment that includes all frames of the raw input data, and the term "split" as used herein is intended to include this case.

Figure 5:
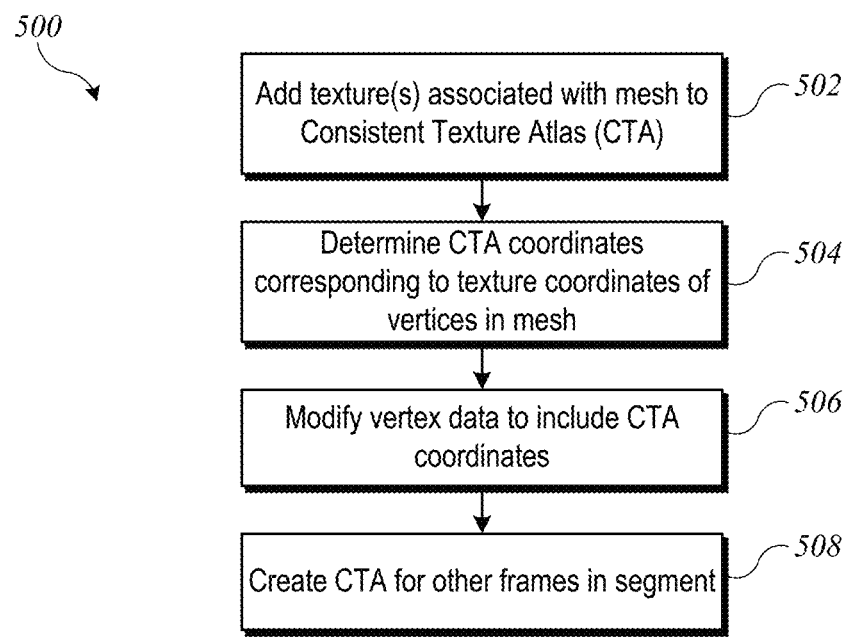
FIG. 5 shows a flow diagram of a CTA generation process according to an embodiment of the present invention.

At block 206, a consistent texture atlas for each frame of a segment is generated, and texture coordinates are re-projected so that the vertices of the source mesh of the CMS are mapped to the consistent texture atlas. As used herein, a "consistent texture atlas," or "CTA," defines a single texture-coordinate space that can include all of the textures used in a frame. FIG. 5 shows a flow diagram of a CTA generation process 500 that can be implemented, e.g., at block 206. At block 502, the texture(s) associated with the mesh at a given frame is (are) added to the CTA, for instance by adding the texels of the texture to a currently unused region of the CTA coordinate space. At block 504, coordinates in the CTA coordinate space corresponding to the original uv coordinates of each vertex in the source mesh are determined, and at block 506, the vertex data for the source mesh of the CMS is modified to include the CTA coordinates. At block 508, a CTA can be generated for one or more other frames of the segment, with the mapping between vertices of the mesh and coordinates in the CTA coordinate space being consistent across frames. Process 500 can be repeated for each CMS in a given segment. In some embodiments, the result of process 500 is a CTA for each frame of the segment and a mapping of the vertices of the mesh to coordinates in the CTA.

Referring again to FIG. 2, at block 208, the CTAs for each segment can be compressed. The CTAs for a segment can be understood as a sequence of two-dimensional images, one image for each frame of the segment. Where a particular texture map represents color, the CTA data may by itself form one or more 2D images. For texture maps representing other attributes, the CTA contains one or more 2D arrays of values representing the attribute, not necessarily forming an image. For purposes of compression, such arrays can be treated as if they were image data. Accordingly, the CTAs for a segment can be compressed using standard 2D video compression techniques such as MPEG-4, MPEG-2, H.264, or the like. Other techniques for compressing 2D video data may also be used.

At block 210, the CMS for each segment can be compressed. Various techniques can be used to compress a CMS. One example is described in M. Sattler et al., "Simple and efficient compression of animation sequences," *Proceedings of the 2005 ACM SIGGRAPH/Eurographics Symposium on Computer Animation*, pp. 209-217 (2005).

Figure 6:
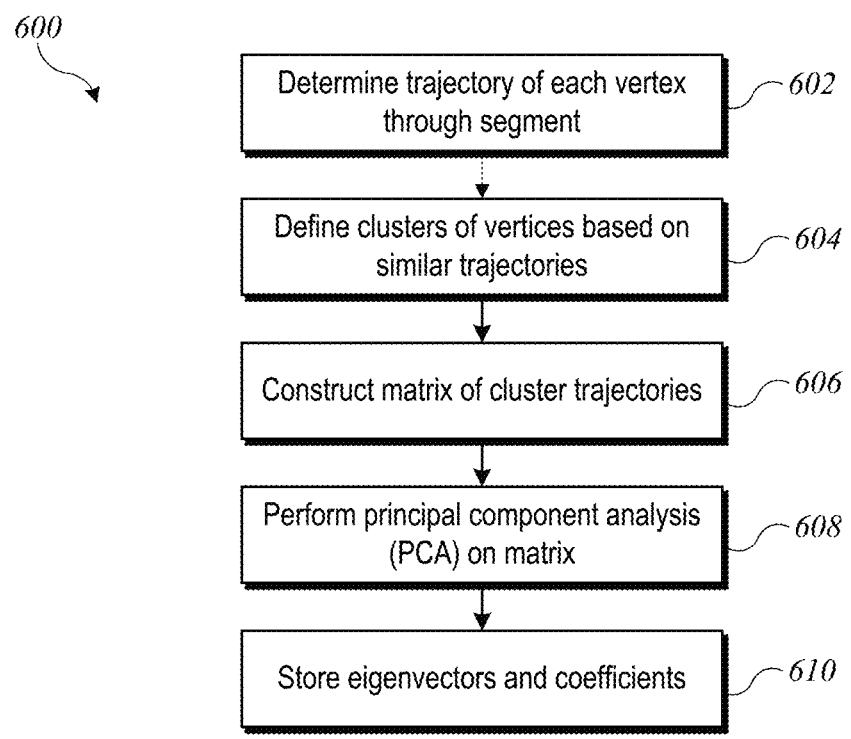
FIG. 6 shows a flow diagram of a CMS compression process according to an embodiment of the present invention.

By way of further illustration, FIG. 6 shows a flow diagram of a CMS compression process 600 that can be used at block 210. At block 602, a trajectory of each vertex through the segment is determined. For instance, each trajectory can be represented as a vector having a component corresponding to each frame of the segment. At block 604, the vertices can be grouped into clusters based on similarity of their trajectory vectors, allowing a single vector to characterize the trajectory of each vertex in the cluster. This can provide significant reduction in dimensionality of the data. At block 606, a matrix of cluster trajectories is constructed, and at block 608, principal component analysis (PCA) is performed on the matrix, producing a set of eigenvalues and coefficients. At block 610, the eigenvalues and coefficients can be stored as compressed vertex data.

Referring again to FIG. 2, at block 212, the compressed data for each segment can be output. The output data can include the compressed CTA data (from block 210) and the compressed CMS data (from block 212). The compressed CMS data for a segment can include one complete set of vertex data (including texture mapping) for one frame, e.g., the first frame of the sequence, and data defining the motion of each vertex through successive frames.

Figure 7:
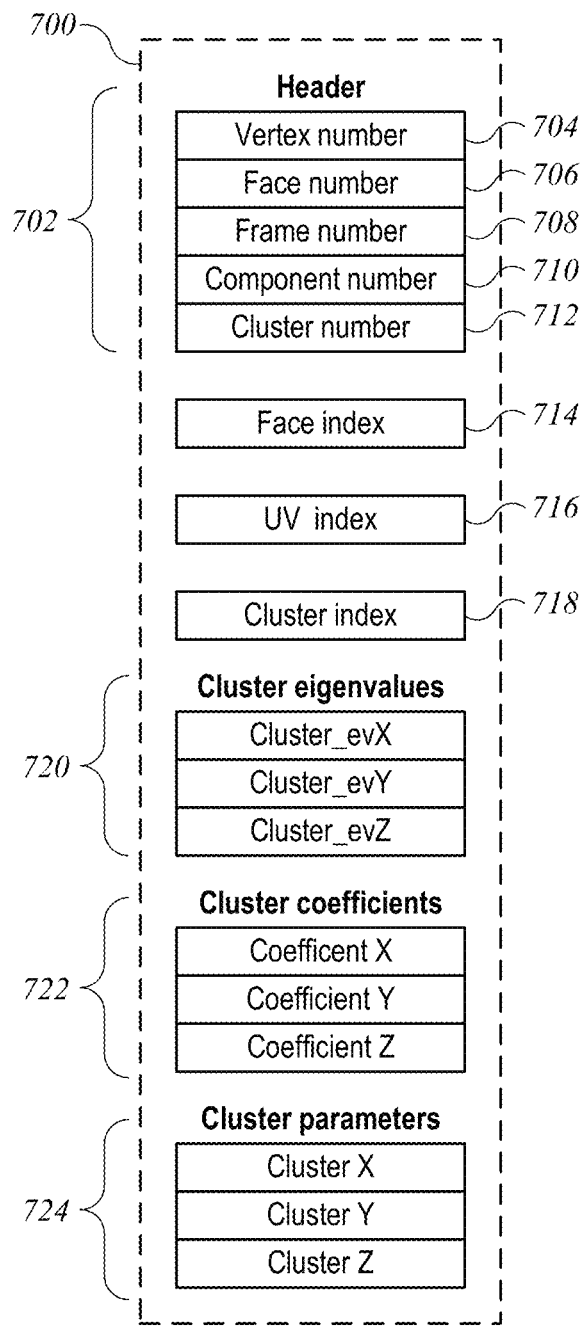
FIG. 7 shows a simplified representation of a bin file structure for storing compressed vertex data according to an embodiment of the present invention.

FIG. 7 shows a simplified representation of a bin file structure 700 for storing compressed vertex data for a CMS according to an embodiment of the present invention. Header 702 includes general information about the mesh, including number of vertices 704, number of faces 706, number of frames in the segment 708, number of components 710, and number of clusters 712. Face index 714 can provide vertex connectivity information for the mesh, e.g., a mapping of vertices to faces. UV index 716 can provide a mapping of vertices to texture coordinates for the mesh. Cluster index 718 can provide a mapping of each vertex to a cluster in the mesh. Cluster eigenvalues 720, cluster coefficients 722, and cluster parameters 724 can store the results of the CMS compression performed at block 210; in this example, the per-cluster eigenvalues and coefficients determined using PCA. Using this data, the object geometry at any frame of the segment can be reconstructed.

The (compressed) output data can be stored and/or transmitted as desired. Stored or transmitted data can be retrieved or received, decompressed by the computer system that receives it, and used to render animations. The compressed data file includes a bin file containing the compressed vertex data (e.g., a compressed CMS) for each segment and a compressed CTA video file containing the CTA for each segment.

Figure 8:
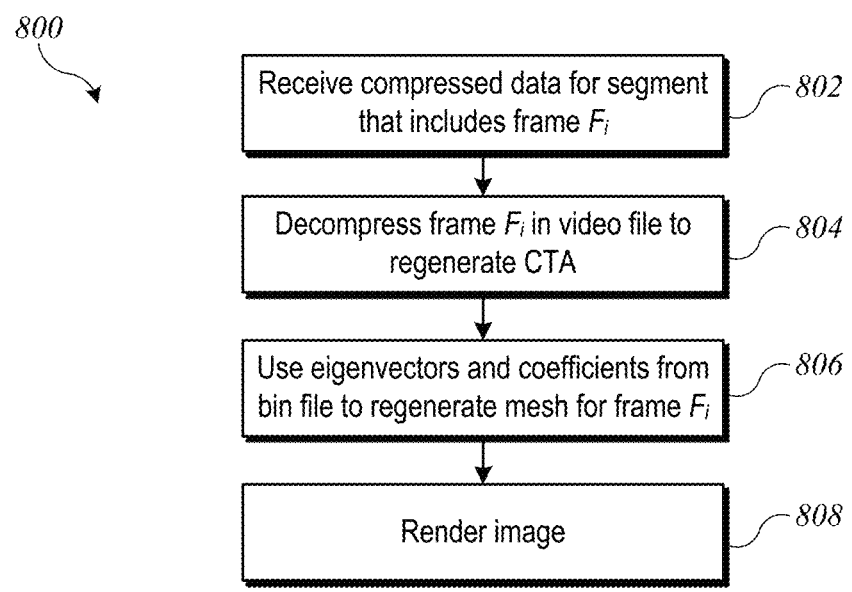
FIG. 8 shows a flow diagram of a process for rendering images from data compressed using a compression process according to an embodiment of the present invention.

FIG. 8 shows a flow diagram of a process 800 for rendering images from data compressed using a compression process according to an embodiment of the present invention. Process 800 can begin at block 802, when the rendering system receives compressed data that includes data for a segment, at least one frame of which (frame $F_i$) is to be rendered. As described above, the compressed data for a segment includes a 2D video file containing the CTA for the segment and a bin file containing the compressed vertex information for the segment. At block 804, the rendering system can regenerate image data for frame $F_i$ in the compressed CTA video file, e.g., using conventional techniques for regenerating in a frame in a 2D video file generated using standard 2D video compression techniques. At block 806, the rendering system can use the eigenvectors and coefficients from the bin file of the segment to regenerate the mesh for a particular frame, e.g., frame $F_i$. At block 808, the rendering system can render an image for frame $F_i$ using the regenerated mesh and the regenerated CTA. Process 800 can be repeated for any number of frames; frames can be rendered successively to generate animation.

In some embodiments, the compressed data structure described herein can support 3D video streaming applications, in which 3D video data generated and/or stored at a source system is transmitted to a receiving system for real-time display. Various streaming applications can be supported, including so-called "live" streaming (where the data is generated and transmitted to one or more receiving devices substantially in real time) as well as streaming from stored 3D video data (where stored data is transmitted to a receiving device either on demand or in accordance with a predetermined schedule such as a broadcast schedule).

For live streaming applications, the data can be compressed as it is generated. For instance, segments can be defined by applying process 300 to each frame as it is generated and imposing an upper limit on the number of frames per segment, and operations of blocks 206-214 can be applied to each segment as soon as it is defined. The resulting compressed data for a segment can be transmitted as soon as it is generated, even if subsequent frames are still being generated. In applications where stored data is streamed, the data can be stored in compressed format and delivered to a receiving device, either on demand or in accordance with a schedule.

Compressed data files of the kind described herein can be streamed similarly to conventional audio and video file formats. Example streaming protocols include Dynamic Adaptive Streaming over HTTP (DASH) or HTTP Live Streaming (HLS). In these and other streaming protocols, video streams are broken up into small chunks, with each chunk corresponding to one or more frames, and a client (or receiving system) can request a chunk of data for playback and specify a desired bit rate. Bit rate can be dynamically modified during playback.

To support dynamic bit rate selection during streaming, mesh and CTA data in a compressed format as described above can be generated and stored for a number of different bit rates. For instance, in the case of mesh data, the number of frames in a bin file can be controlled, and different versions of a bin file corresponding to different bit rates can be generated and stored. The bit rate can be modified, e.g., by modifying the number of vertices. Corresponding video data files (i.e., compressed texture data) can also be generated for different bit rates and time-aligned with the compressed mesh data. Time-aligned audio files can also be provided and streamed with the compressed mesh data and video data files.

In some embodiments, the various versions of the video files and compressed-mesh files (bin files) are stored separately, and a streaming client can independently select a bit rate for the mesh data and a bit rate for the texture data. Where audio is also provided, audio files can also be stored, and selection of an audio bit rate may also be supported.

At the receiving system, a given frame can be rendered as soon as all of its data has been received. For instance, process 800 can be applied to regenerate one or more frames of a given segment without using data from any previous segments and without waiting for any data from subsequent segments. Thus, a receiving system can begin rendering and displaying systems at any point in a stream. (It may be necessary for the receiving system to wait for a new segment; however, as noted above, the compression process can limit the number of frames per segment, which limits how long the receiving system would need to wait for a new segment.)

Figure 9:
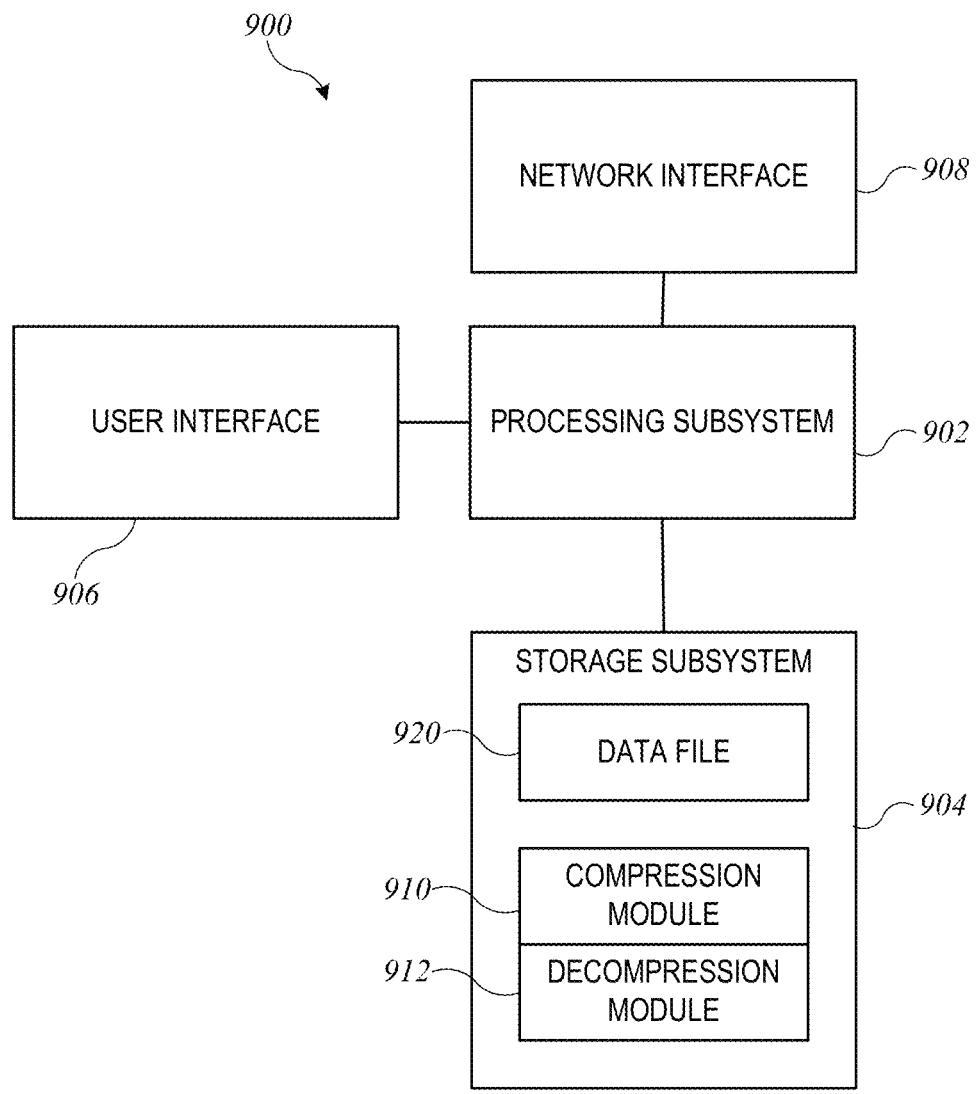
FIG. 9 is a simplified block diagram of a computer system implementing an embodiment of the present invention.

Processes of the kind described herein can be implemented using computer systems of generally conventional design, programmed to carry out operations of processes such as process 200 and/or process 800 described above. FIG. 9 is a simplified block diagram of a computer system 900 implementing an embodiment of the present invention. In this implementation, computer system 900 includes processing subsystem 902, storage subsystem 904, user interface 906, and network interface 908.

Processing subsystem 902 can include one or more general purpose programmable processors capable of executing program code instructions to perform various operations, including operations described herein. In some embodiments, processing subsystem 902 may incorporate scalable processing hardware (e.g., an array of server blades or the like) that can be adapted dynamically to varying processing needs.

Storage subsystem 904 can include a combination of volatile and nonvolatile storage elements (e.g., DRAM, SRAM, flash memory, magnetic disk, optical disk, etc.). Portions of storage subsystem 904 may be used to store program code to be executed by processing subsystem 904. Examples of program code can include compression module 910 (e.g., code implementing process 200 of FIG. 2) and/or decompression module 912 (e.g., code implementing process 800 of FIG. 8). Portions of storage subsystem 904 may also be used to store data files 920, including raw 3D video files to be processed using compression module 910, compressed data files generated using compression module 910, and/or decompressed data generated using decompression module 912.

User interface 906 can include user input devices and/or user output devices. Examples of user input devices include a keyboard, mouse, joystick, touch pad, touch screen, microphone, and so on. Examples of user output devices include a display device (which may be touch-sensitive), speakers, indicator lights, a printer, and so on.

Network interface 908 can be implemented using any combination of hardware and software components that together enable communication with other computer systems. In some embodiments, network interface 908 may communicate with a local area network (LAN) using Ethernet, Wi-Fi, or other similar technologies, and the LAN may enable communication with a wide area network (WAN) such as the internet. Via network interface 908, computer system 900 can communicate with one or more other computer systems to support distributed implementations of processes described herein.

In some embodiments, computer system 900 may operate in a server configuration, communicating with one or more client computers via network interface 908. For example, computer system 900 may operate compression module 910 to generate compressed data, then transmit the compressed data to one or more client computers via network interface 908. In embodiments where computer system 900 is operated remotely via network interface 908, local user interface 906 may be limited (e.g., just a few indicator lights) or omitted entirely.

It will be appreciated that computer system 900 is illustrative and that variations and modifications are possible. For instance, although computer system 900 and its operations are described herein with reference to particular blocks, it is to be understood that these blocks are defined for convenience of description and are not intended to imply a particular physical arrangement of component parts or a particular software architecture. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including computing devices and computer systems implemented using any combination of circuitry and software.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible computer system or other electronic device, or the program code may be provided separately from electronic devices (e.g., as a separately packaged computer-readable storage medium or via an internet download process that results in the program code being stored on a computer-readable storage medium of the electronic device that downloads it).

In alternative embodiments, a purpose-built processor may be used to perform some or all of the operations described herein. Such processors may be optimized, e.g., for performing specific operations described herein, such as video compression.

While the invention has been described with reference to specific embodiments, those skilled in the art with access to the present disclosure will recognize that variations and modifications are possible. Processing operations described sequentially can be performed in parallel, order of operations can be modified, and operations can be combined or omitted. Further, operations not specifically described herein may be added. The particular algorithms for segmenting a sequence of 3D video frames, identifying consistent mesh sequences, compressing texture data, and/or compressing consistent mesh sequence data described above are illustrative, and other algorithms may be substituted.

As noted above, a frame may contain one or more meshes, and each mesh may be compressed in the manner described herein. All texture maps associated with a mesh in a given frame can be combined in a single CTA. In some embodiments where a frame contains multiple meshes, a topological change in any one mesh may result in defining a segment boundary. Other implementations are possible.

Thus, although the invention has been described with respect to specific embodiments, it will be appreciated that the invention is intended to cover all modifications and equivalents within the scope of the following claims.

What is claimed is:

1. A computer-implemented method for compressing data, the method comprising:
   receiving raw three-dimensional (3D) video data descriptive of a sequence of frames, wherein the raw 3D video data for a frame includes a mesh and a texture map associated with the mesh;
   determining, from the raw 3D video data, a first segment of raw 3D video data comprising a first set of frames, wherein the first set of frames comprise a first set of vertices modifying the first set of vertices to generate a second set of vertices for the first set of frames, wherein a quantity of vertices in the second set of vertices is less than a quantity of vertices in the first set of vertices;
   constructing a consistent texture atlas for the first segment from the texture map for at least one frame in the first set of frames;
   compressing the first set of frames comprising the second set of vertices;
   compressing the consistent texture atlas; and
   outputting, as compressed data, the compressed first set of frames and the compressed consistent texture atlas, wherein a quantity of vertices in the second set of vertices is determined based at least in part on a target bitrate for streaming the first segment.

2. The computer-implemented method of claim 1, wherein a quantity of vertices within second set of vertices is less than a quantity of vertices within the first set of vertices.

3. The computer-implemented method of claim 1, further comprising:
   receiving, a streaming video request associated with the raw 3D video data comprising a bit rate indicator;
   based at least in part on the bit rate indicator, outputting, as compressed data, the first compressed consistent mesh sequence, the second compressed consistent mesh sequence, or the compressed third consistent mesh sequence.

4. The computer-implemented method of claim 1, wherein constructing the consistent texture atlas for the first segment further comprises:
   constructing the consistent texture atlas for the first segment, wherein the first segment comprises the second set of vertices.

5. The computer-implemented method of claim 1, wherein constructing the consistent texture atlas for the first segment further comprises:
   constructing the consistent texture atlas for the first segment, wherein the first segment comprises the first set of vertices.

6. A non-transitory computer-readable storage medium having stored thereon instructions for causing at least one computer system to execute the instructions comprising:
   receiving raw three-dimensional (3D) video data descriptive of a sequence of frames, wherein the raw 3D video data for a frame includes a mesh and a texture map associated with the mesh;
   determining, from the raw 3D video data, a first segment of raw 3D video data comprising a first set of frames, wherein the first set of frames comprise a first set of vertices modifying the first set of vertices to generate a second set of vertices for the first set of frames;
   constructing a consistent texture atlas for the first segment from the texture map for at least one frame in the first set of frames;
   compressing the first set of frames comprising the second set of vertices;
   compressing the consistent texture atlas;
   outputting, as compressed data, the compressed first set of frames and the compressed consistent texture atlas;
   modifying the first set of vertices to generate a third set of vertices being different than the second set of vertices, wherein the quantity of vertices within the second set of vertices is greater than a quantity of vertices within the third set of vertices;
   compressing the first set of frames comprising the first set of vertices to generate a first compressed consistent mesh sequence;
   compressing the first set of frames comprising the second set of vertices to generate a second compressed consistent mesh sequence; and
   compressing the first set of frames comprising the third set of vertices to generate a third compressed third consistent mesh sequence.

7. The non-transitory computer-readable storage medium of claim 6, wherein a quantity of vertices within second set of vertices is less than a quantity of vertices within the first set of vertices.

8. The non-transitory computer-readable storage medium of claim 6, wherein a quantity of vertices in the second set of vertices is determined based at least in part on a target bitrate for streaming the first segment.

9. The non-transitory computer-readable storage medium of claim 6, the instructions further comprising:
   receiving, a streaming video request associated with the raw 3D video data comprising a bit rate indicator;
   based at least in part on the bit rate indicator, outputting, as compressed data, the first compressed consistent mesh sequence, the second compressed consistent mesh sequence, or the compressed third consistent mesh sequence.

10. The non-transitory computer-readable storage medium of claim 6, wherein constructing the consistent texture for the first segment further comprises:
    constructing the consistent texture for the first segment, wherein the first segment comprises the second set of vertices.

11. The non-transitory computer-readable storage medium of claim 6, wherein constructing the consistent texture atlas for the first segment further comprises:
    constructing the consistent texture for the first segment, wherein the first segment comprises the first set of vertices.

12. A system for compressing data, comprising:
    one or more processors; and
    a memory coupled with the one or more processors, the memory configured to store instructions that when executed by the one or more processors cause the one or more processors to:
    receive raw three-dimensional (3D) video data descriptive of a sequence of frames, wherein the raw 3D video data for a frame includes a mesh and a texture map associated with the mesh;
    determine, from the raw 3D video data, a first segment of raw 3D video data comprising a first set of frames, wherein the first set of frames comprise a first set of vertices modify the first set of vertices to generate a second set of vertices for the first set of frames;

construct a consistent texture atlas for the first segment from the texture map for at least one frame in the first set of frames;

compress the first set of frames comprising the second set of vertices;

compress the consistent texture atlas; and output, as compressed data, the compressed first set of frames and the compressed consistent texture atlas, wherein a quantity of vertices in the second set of vertices is determined based at least in part on a target bitrate for streaming the first segment.

13. The system of claim 12, wherein a quantity of vertices within second set of vertices is less than a quantity of vertices within the first set of vertices.

14. The system of claim 12, wherein the instructions that when executed by the one or more processors further cause the one or more processors to:

modify the first set of vertices to generate a third set of vertices being different than the second set of vertices, wherein a quantity of vertices within the second set of vertices is less than a quantity of vertices within the first set of vertices and the quantity of vertices within the second set of vertices is greater than a quantity of vertices within the third set of vertices;

compress the first set of frames comprising the first set of vertices to generate a first compressed consistent mesh sequence;

compress the first set of frames comprising the second set of vertices to generate a second compressed consistent mesh sequence; and compress the first set of frames comprising the third set of vertices to generate a third compressed third consistent mesh sequence.

15. The system of claim 14, further comprising:

receive, a streaming video request associated with the raw 3D video data comprising a bit rate indicator;

based at least in part on the bit rate indicator, output, as compressed data, the first compressed consistent mesh sequence, the second compressed consistent mesh sequence, or the compressed third consistent mesh sequence.

16. The system of claim 12, wherein constructing the consistent texture for the first segment further comprises:

construct the consistent texture atlas for the first segment, wherein the first segment comprises the second set of vertices.

* * * * *